(12) United States Patent
Maruyama et al.

(10) Patent No.: US 12,032,268 B2
(45) Date of Patent: Jul. 9, 2024

(54) OPTICAL MODULATOR

(71) Applicant: Fujitsu Optical Components Limited, Kawasaki (JP)

(72) Inventors: Shinji Maruyama, Sapporo (JP); Shuntaro Makino, Kawasaki (JP); Yoshimitsu Sakai, Sapporo (JP); Yoshinobu Kubota, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 332 days.

(21) Appl. No.: 17/168,842

(22) Filed: Feb. 5, 2021

(65) Prior Publication Data

US 2021/0373416 A1 Dec. 2, 2021

(30) Foreign Application Priority Data

May 26, 2020 (JP) .................... 2020-091684

(51) Int. Cl.
*G02F 1/31* (2006.01)

(52) U.S. Cl.
CPC ............ *G02F 1/31* (2013.01); *G02F 2201/02* (2013.01); *G02F 2202/20* (2013.01); *G02F 2203/07* (2013.01)

(58) Field of Classification Search
CPC .. G02F 1/3137; G02F 1/3131; G02F 2203/07; G02F 2202/20; G02F 2201/02; G02F 1/31

See application file for complete search history.

(56) References Cited

U.S. PATENT DOCUMENTS

| 2007/0201792 A1* | 8/2007 | Lange .................... G02B 6/126 385/14 |
| 2016/0011377 A1* | 1/2016 | Okamura ............... G02B 6/327 385/31 |
| 2018/0120522 A1* | 5/2018 | Kato .................... G02B 6/4213 |

FOREIGN PATENT DOCUMENTS

| JP | 2004-287116 A | 10/2004 |
| JP | 2020-71293 | 5/2020 |

OTHER PUBLICATIONS

Japanese Office Action issued in corresponding Japanese Application No. 2020-091684 dated Oct. 10, 2023.
Chinese Office Action issued in corresponding Chinese Application No. 202110215316.2 dated Dec. 26, 2023.

* cited by examiner

*Primary Examiner* — Christopher Stanford
*Assistant Examiner* — Journey F Sumlar
(74) *Attorney, Agent, or Firm* — STAAS & HALSEY LLP

(57) ABSTRACT

An optical modulator in which an optical signal is input from one side of a package, includes in the package, a chip that optically modulates the optical signal and in which an input waveguide and an output waveguide of the optical signal are led to mutually different destinations each being one end of the chip facing the one side of the package and a side surface of the chip orthogonal to the one end of the chip; an input optical system coupled to the input waveguide of the chip; and an output optical system coupled to the output waveguide of the chip.

17 Claims, 16 Drawing Sheets

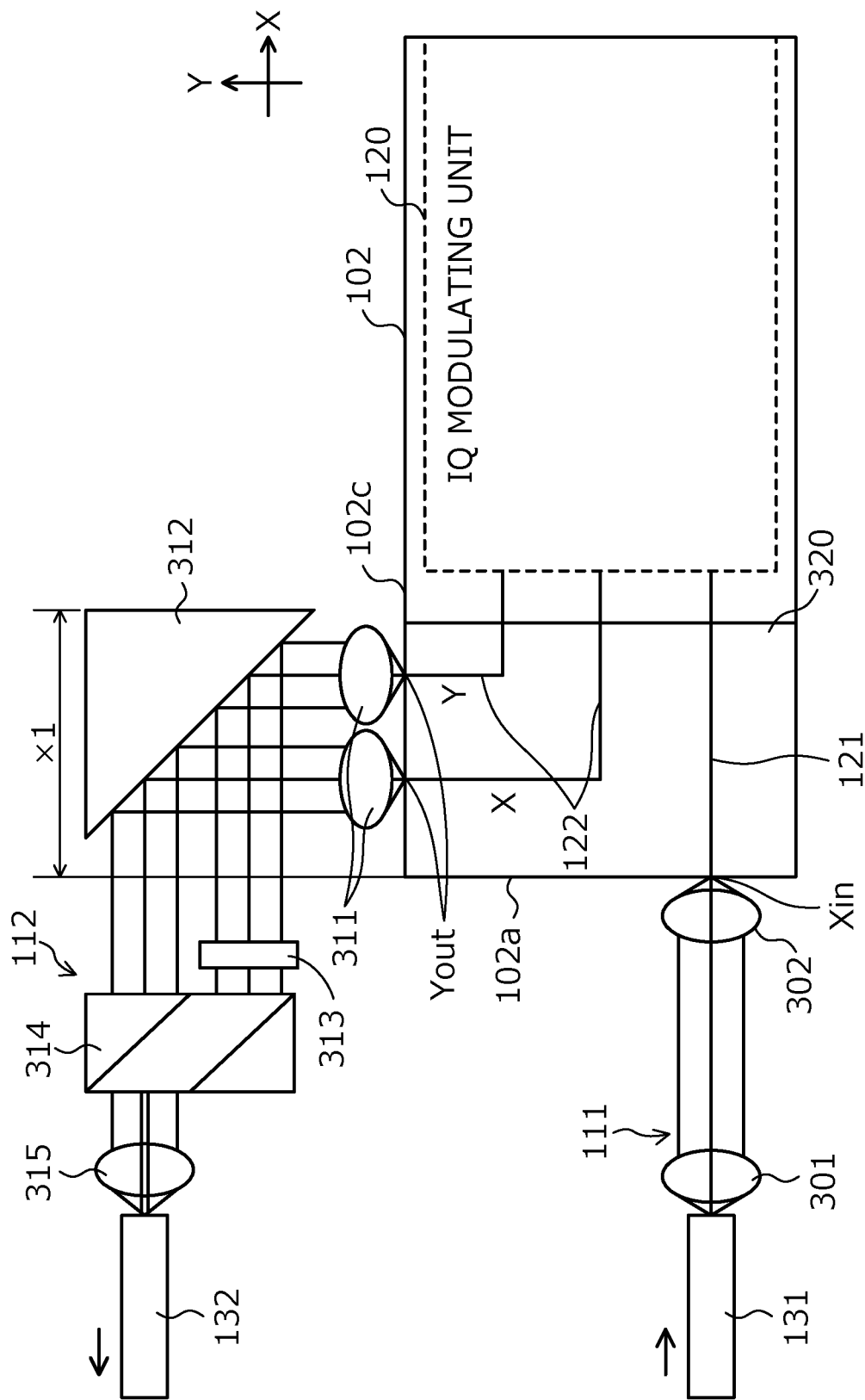

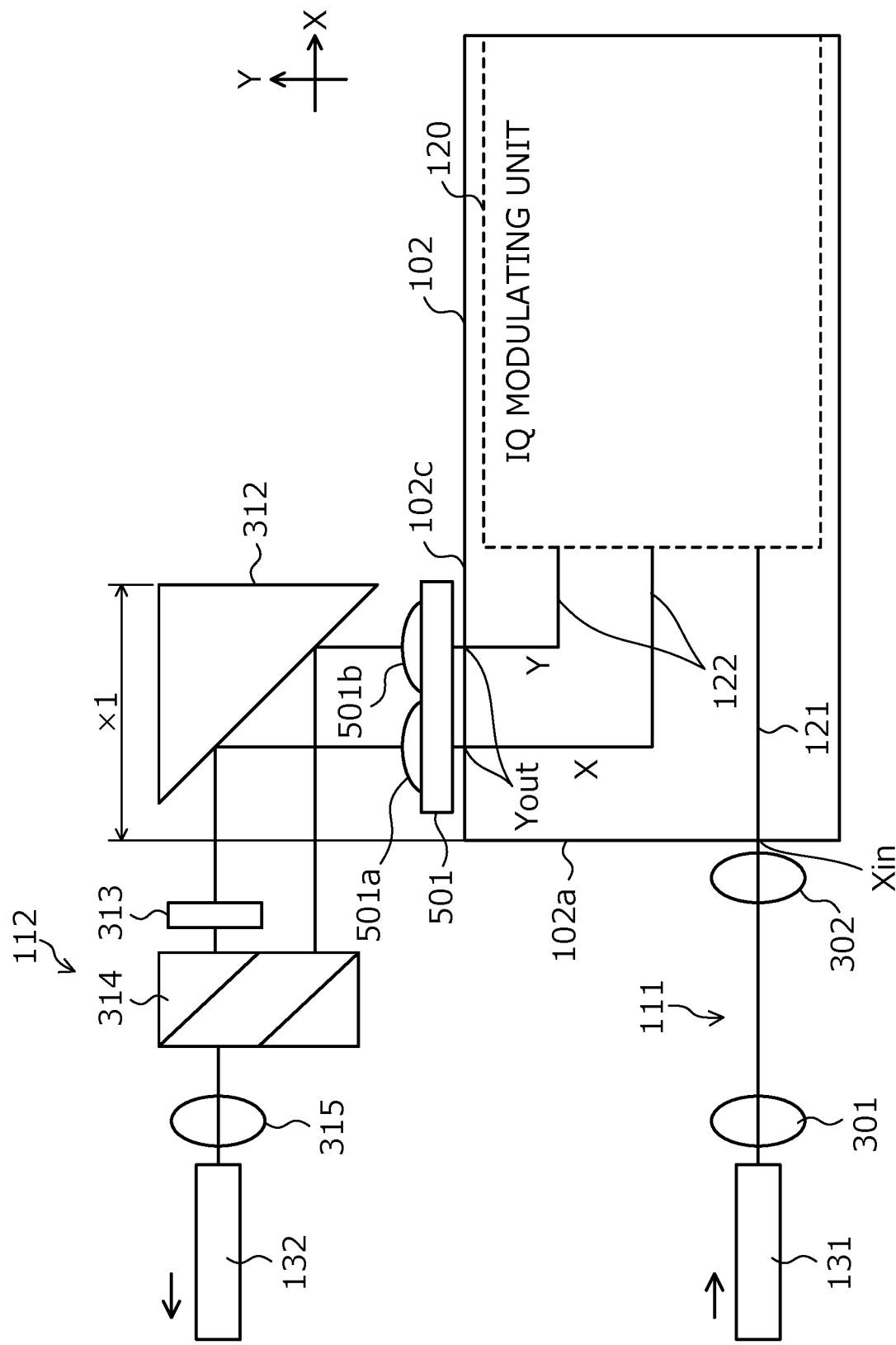

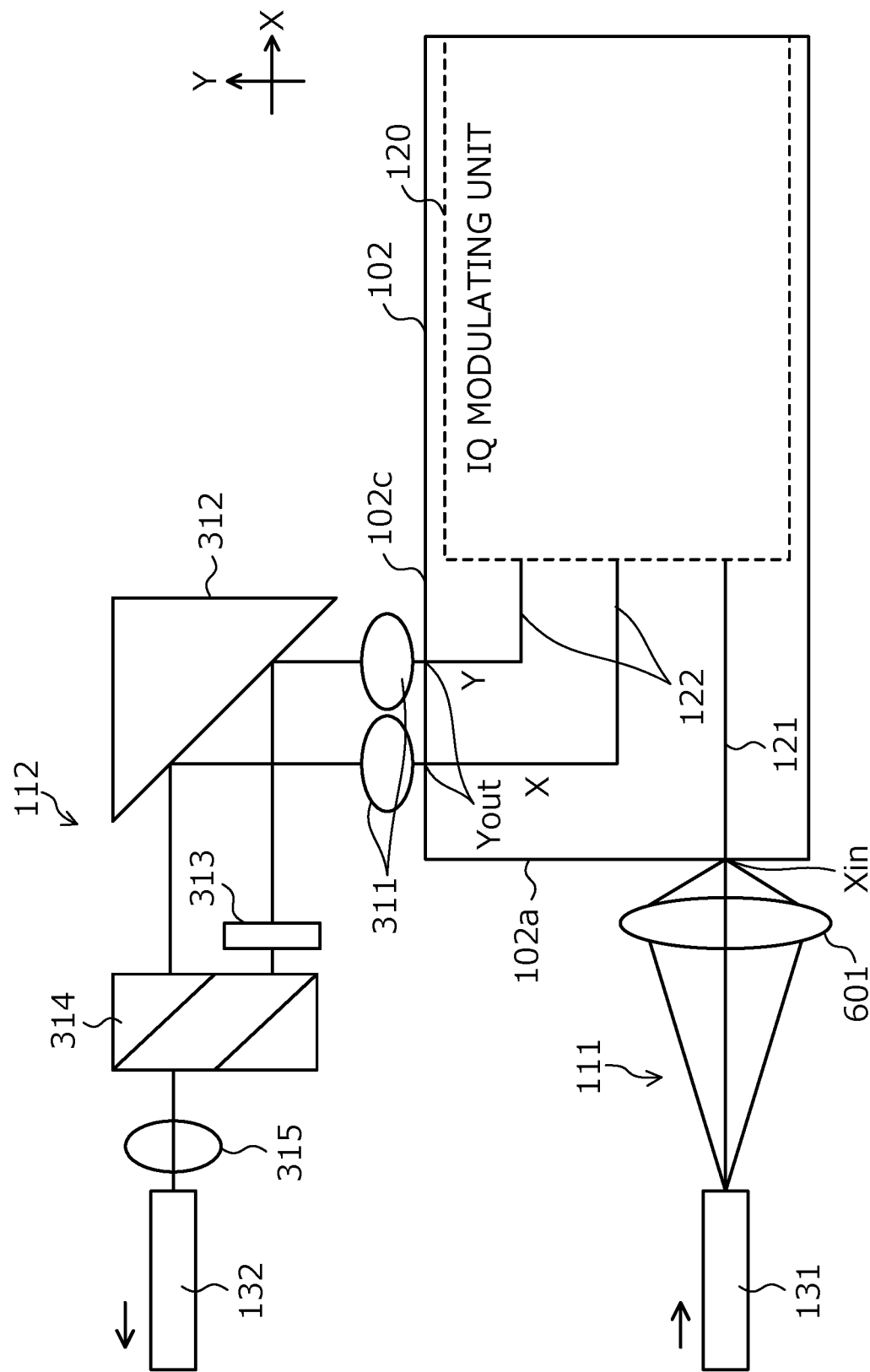

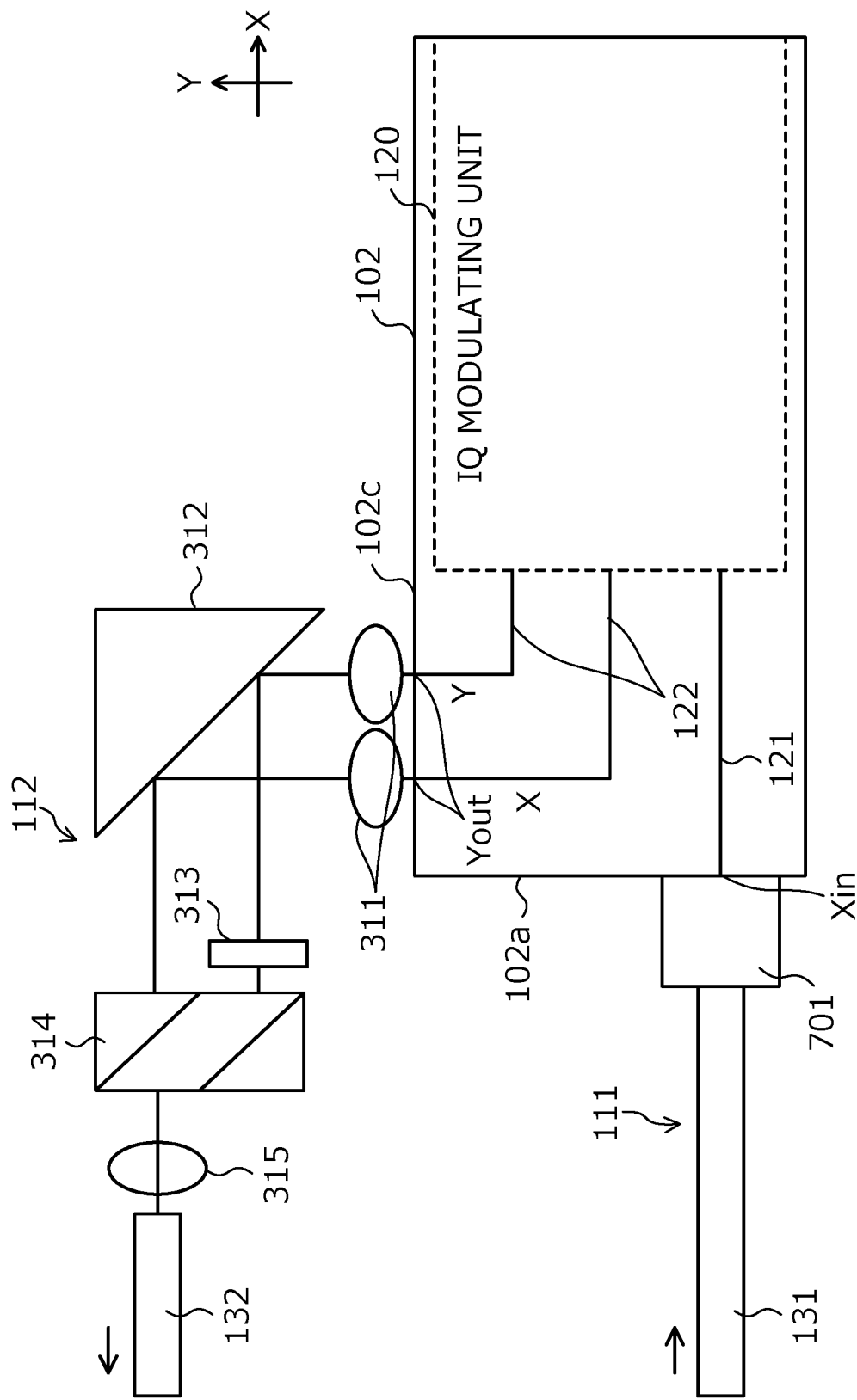

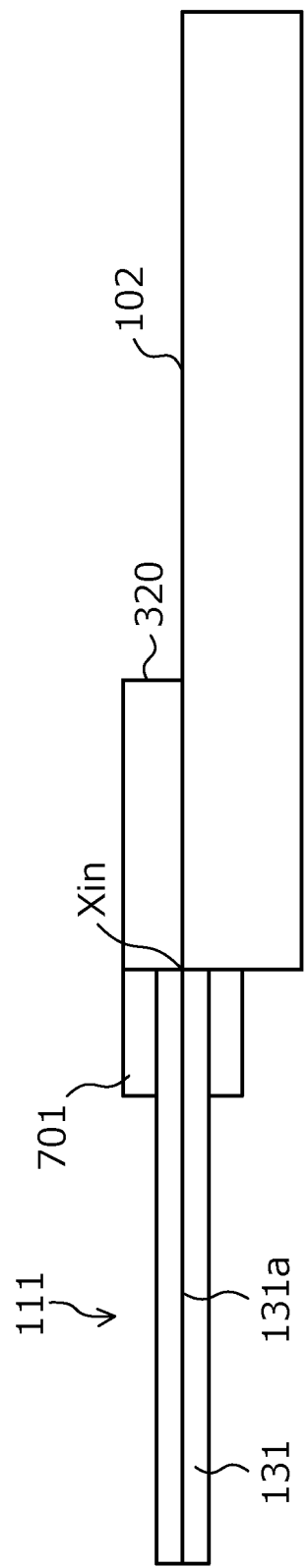

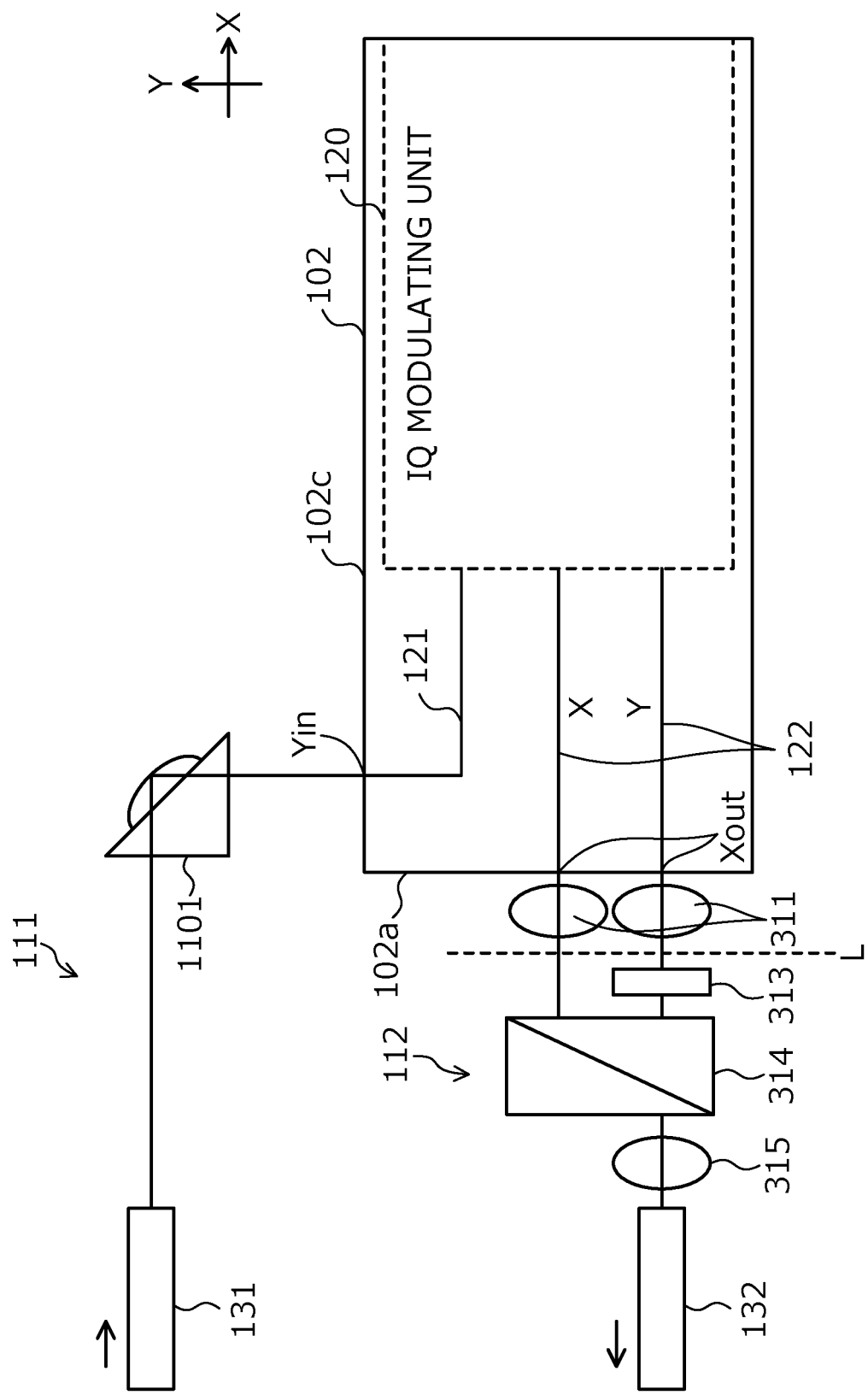

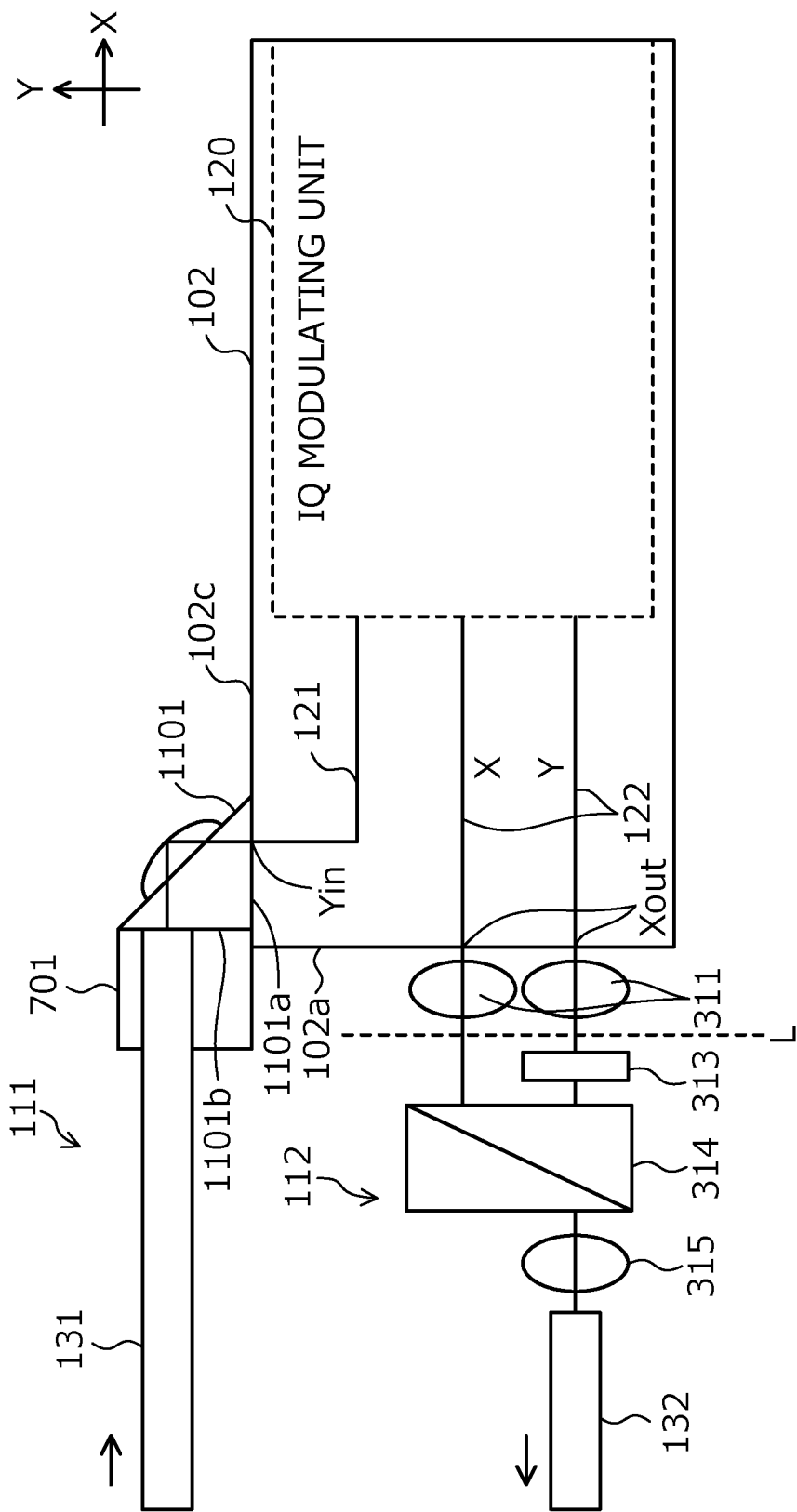

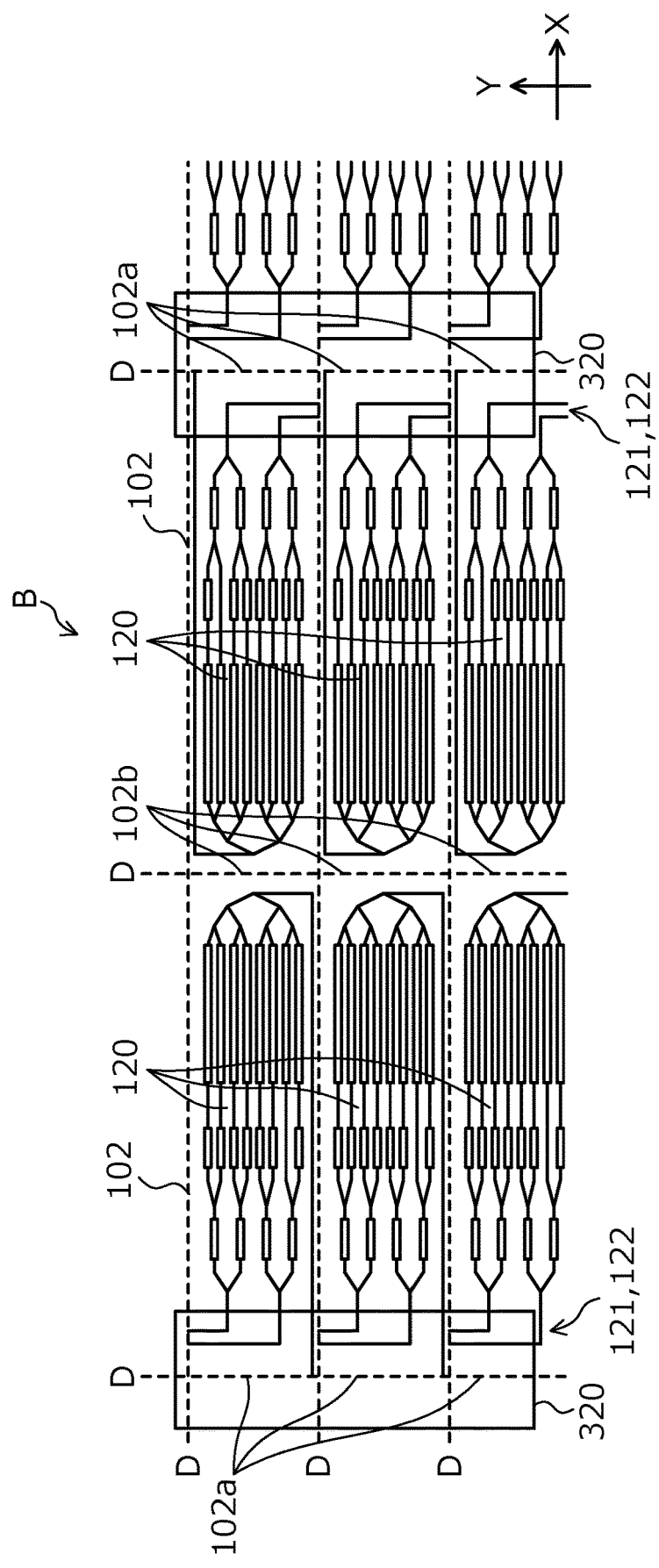

OPTICAL MODULATOR

CROSS REFERENCE TO RELATED APPLICATIONS

This application is based upon and claims the benefit of priority of the prior Japanese Patent Application No. 2020-091684, filed on May 26, 2020, the entire contents of which are incorporated herein by reference.

FIELD

The embodiments discussed herein are related to an optical modulator.

BACKGROUND

High-performance optical modulators are indispensable for high-speed optical communication. Recently, a high bandwidth coherent driver modulator (HB-CDM) that reduces the size of and integrates an optical communications device has been disclosed. Further, a lithium niobate $LiNbO_3$ (hereinafter, LN) substrate is used for a substrate (chip) of the optical modulator, whereby favorable characteristics in terms of insertion loss and transmission characteristics may be obtained. The optical modulator is formed on the LN substrate by titanium (Ti) diffusion.

While such LN optical modulators (bulk LN optical modulators) are widely used, when applied to a HB-CDM, chip size increases. A HB-CDM has a structure in which input and output fibers for optical signals are disposed on one side of the package and a driver for RF signals is disposed on the other side thereof. Therefore, in HB-CDMs, application of a thin-film LN optical modulator using thin-film LN as a chip to enable greater size reductions than bulk LN optical modulators is being studied.

As a technology related to an optical modulator, for example, an optical modulator has been disclosed that is structured to have an input waveguide and an output waveguide for optical signals, disposed at a same end face (for example, refer to Japanese Laid-Open Patent Publication No. 2004-287116).

SUMMARY

According to an aspect of an embodiment, an optical modulator in which an optical signal is input from one side of a package, includes in the package, a chip that optically modulates the optical signal and in which an input waveguide and an output waveguide of the optical signal are led to mutually different destinations each being one end of the chip facing the one side of the package and a side surface of the chip orthogonal to the one end of the chip; an input optical system coupled to the input waveguide of the chip; and an output optical system coupled to the output waveguide of the chip.

An object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3A is a diagram depicting a specific example of a configuration of the optical modulator according to the first embodiment.

FIG. 5 is a diagram depicting a specific example of a configuration of the optical modulator according to the first embodiment.

FIG. 6 is a diagram depicting a specific example of a configuration of the optical modulator according to the first embodiment.

FIG. 7A is a diagram depicting a specific example of a configuration of the optical modulator according to the first embodiment.

FIG. 7B is a diagram depicting a specific example of a configuration of the optical modulator according to the first embodiment.

FIG. 11 is a diagram depicting a specific example of a configuration of the optical modulator according to the second embodiment.

FIG. 12 is a diagram depicting a specific example of a configuration of the optical modulator according to the second embodiment.

FIG. 13B is a plan view of a state of the chip of the optical modulator according to the embodiments during manufacture.

DESCRIPTION OF THE INVENTION

Figure 1:
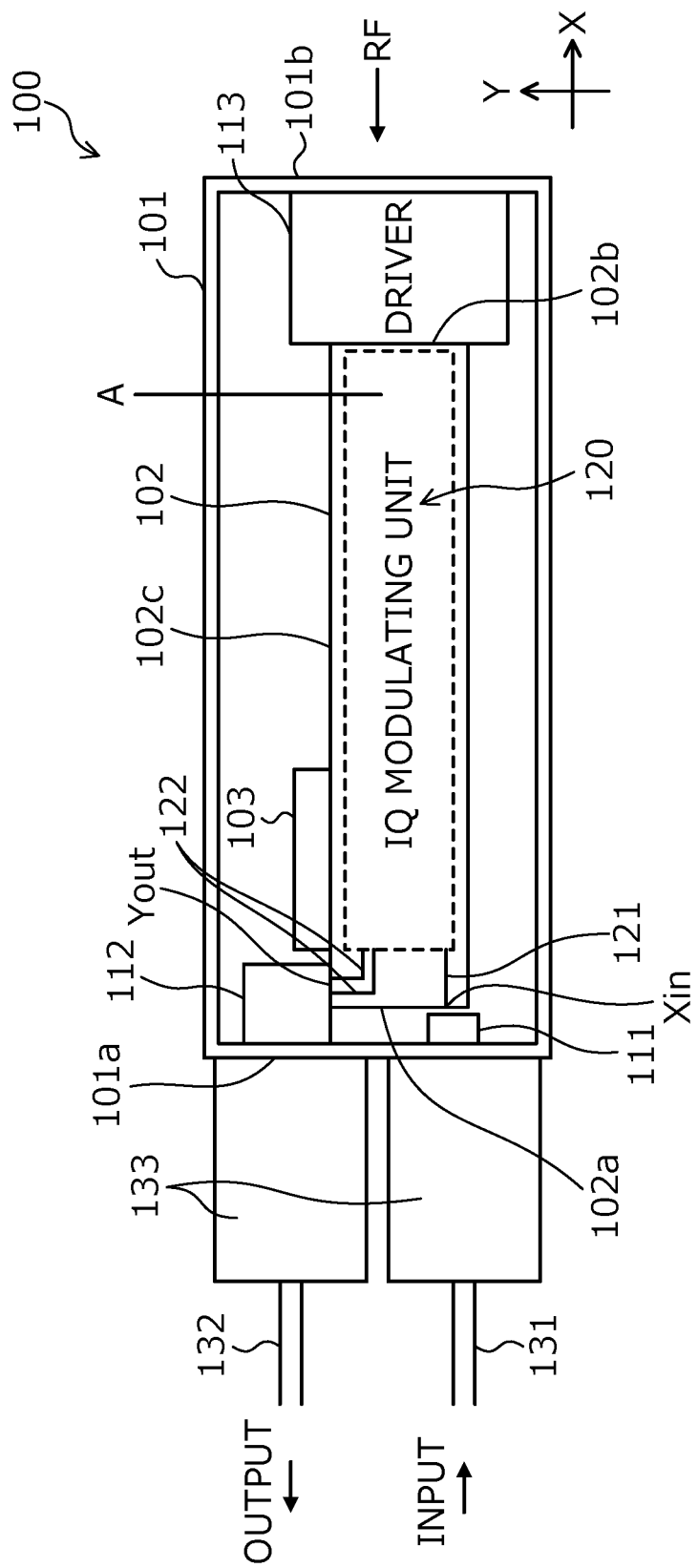
FIG. 1 is a plan view of an optical modulator according to a first embodiment.

First, problems associated with the conventional technologies are described. In the HB-CDM, an optical system that performs polarization coupling of two output optical beams and an optical system for increasing an interval between an input optical beam and an output optical beam according to a distance of the input fiber and the output fiber have to be integrated into a package of the optical modulator. Here, when a width of the chip in the package increases, the number of chips that can be obtained per wafer decreases, leading to increases in cost.

A length of the package of the optical modulator is stipulated by OIF standards ((Implementation Agreement for the High Bandwidth Coherent Driver Modulator (HB-CDM), IA #OIF-HB-CDM-01.0). Therefore, the length of the chip housed in the package is also limited.

In the LN optical modulator, a drive voltage ($V\pi$) of the chip is dependent on a length of an interaction part for a high-frequency electrical signal and light. Therefore, when the chip length is reduced, $V\pi$ increases, power consumption increases, modulation loss increases, and the like. In the HB-CDM, the driver is disposed in the package, on the other end thereof in a length direction and the length of the chip in the package is reduced correspondingly. In addition, the length of the chip is also reduced by optical systems that are disposed in the package, on one side thereof; the optical systems input and output optical signals. To enhance the characteristics of the LN optical modulator of the HB-CDM, the length of the chip in the package has to be as long as possible to make Vπ as small as possible.

Embodiments of an optical modulator are described in detail hereinafter with reference to the accompanying drawings. In the embodiments, an optical modulator of a HB-CDM is described as an example. The optical modulator of the HB-CDM, as described above, has a structure in which input and output fibers for optical signals are connected to a first side of a package, and a driver for RF signals is disposed on a second side of the package. Therefore, in the package, on the first side thereof, optical systems for inputting and outputting optical signals are disposed and on the second side, the driver is disposed; and the chip (substrate) of the optical modulator is disposed between the driver and the optical systems for inputting and outputting optical signals.

In the embodiments, optical waveguides on the chip disposed in the package are led in a length direction and a width direction of the chip. The width direction is an angular direction that is orthogonal (90°) to the length direction of the chip. Further, any one of the optical systems respectively for inputting and outputting optical signals is disposed to partially overlap in the length direction of the chip. In other words, the optical system for input or the optical system for output is not disposed on the length direction of the chip and is shifted in be disposed at a position in the width direction uninvolved with the length direction of the chip. As a result, in the optical modulator of the HB-CDM, the length of the chip in the package is as long as possible and characteristics of the chip (optical modulator) may be enhanced.

For example, of the optical system for input and the optical system for output, the optical system that has an optical path length that is longer and a number of components that is greater is disposed in the width direction of the chip.

Further, an input optical system 111 or an output optical system 112 is disposed shifted in a width direction Y of a chip 102, whereby the other remaining optical system alone may be disposed at a first end 102a of the chip 102. As a result, the input optical system 111 and the output optical system 112 may both be disposed with some leeway.

Hereinafter, in a first embodiment, a configuration in which the optical system for input is disposed on the length direction of the chip and an optical system for output is disposed in the width direction of the chip is described. In this instance, regarding the optical waveguide formed on the chip, the optical waveguide for input is disposed along the length direction of the chip and the optical waveguide for output is disposed bent in the width direction of the chip.

Figure 2:
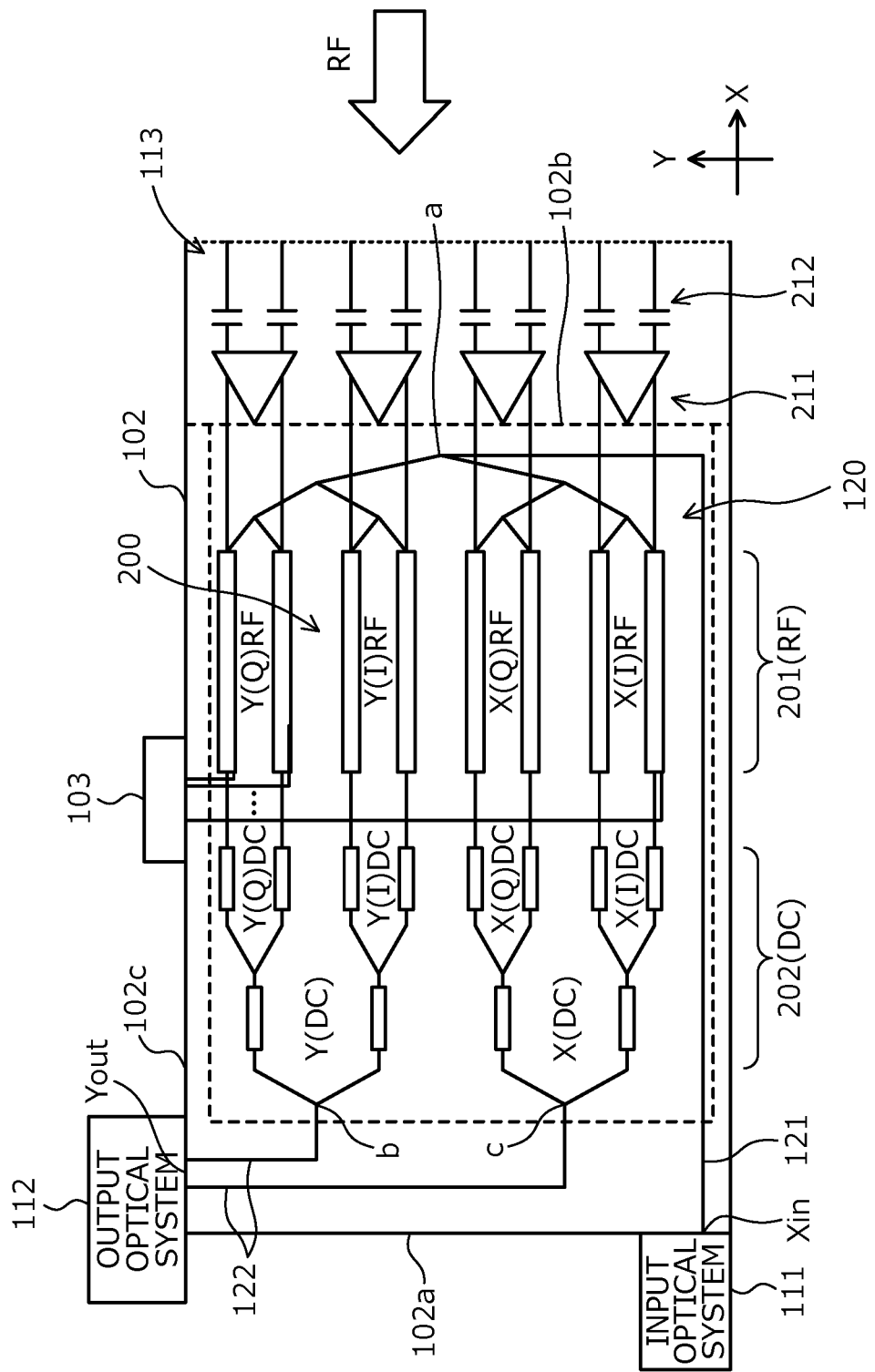
FIG. 2 is an enlarged view of a portion of FIG. 1.

FIG. 1 is a plan view of an optical modulator according to a first embodiment. FIG. 2 is an enlarged view of a portion of FIG. 1. An optical modulator 100 is equipped with various parts in a package 101. In the package 101, the chip 102 is a thin-film LN structure that configures a Mach-Zehnder type optical modulator, a termination board 103, the input optical system 111, the output optical system 112, and a driver 113 are provided.

The package 101 has a horizontally long predetermined size stipulated by the HB-CDM, and on a first side 101a thereof orthogonal to a length direction X, an input optical fiber 131 that inputs an optical signal and an output optical fiber 132 are provided. The input optical fiber 131 is attached to the package 101 via a fiber boot 133 and an optical signal transmitted via the input optical fiber 131 is output to the input optical system 111 in the package 101.

The output optical fiber 132 is attached to the package 101 via another fiber boot 133. An optical signal (modulated light) output from the output optical system 112 in the package 101 is transmitted to an external device via the output optical fiber 132.

Here, in the package 101, the input and the output optical systems 111, 112, the chip 102, and the driver 113 are disposed from the first side 101a to a second side 101b in the length direction X. A high-frequency electrical signal (RF signal) for the driver 113 is input from the second side 101b of the package 101.

An optical signal input from the input optical fiber 131 via the input optical system 111 is input to an IQ modulating unit 120 via an input waveguide 121 on the chip 102. Further, an RF signal for modulation is input to the driver 113, which amplifies the RF signal and outputs the RF signal to the IQ modulating unit 120. The IQ modulating unit 120 is a Mach-Zehnder type optical modulator and based on the RF signal, the IQ modulating unit 120 optically modulates input light in an interaction part. The optically modulated light that is output is output from output waveguides 122 to the output optical fiber 132 via the output optical system 112.

FIG. 2 depicts an enlarged view of mainly a portion of the optical waveguide of the IQ modulating unit 120 on the chip 102 (region A in FIG. 1). The chip 102 is formed by forming the optical waveguide on a thin-film LN substrate. Further, the driver 113 that drives the chip 102 is formed to include amplifiers 211 and capacitors 212. An optical waveguide formed on the IQ modulating unit 120 is formed in a shape folded in the length direction X. The input waveguide 121 optically coupled to the input optical system 111 at the first end 102a of the chip 102 is led along the length direction X of the chip 102 to a second end 102b of the chip 102. Further, at a bifurcation portion a, the input waveguide 121 is branched into X-polarization and Y-polarization optical waveguides 200 and provided to return toward the first end 102a. These X-polarization and Y-polarization optical waveguides 200 are further branched into two IQ branches, for a total of eight branches.

The optical waveguides 200 in the IQ modulating unit 120 have a length corresponding to the interaction length. Configuration is described sequentially along a waveguide direction of the optical waveguides 200. Along the eight optical waveguides 200 after the branching at the bifurcation portion a, eight RF electrodes 201 led from the driver 113 are formed. The RF electrodes 201 lead to and terminate at the termination board 103 disposed in the width direction Y of the chip 102.

Subsequently, the eight optical waveguides 200 pass through portions of X-polarization, Y-polarization, and IQ-specific DC electrodes 202 (total of 8), and thereafter, are combined into four optical waveguides 200 and pass through the DC electrodes 202 (total of 4) for Y-polarization, X-polarization. DC bias for adjusting an operating point of the optical modulator is applied to the DC electrodes 202. The four optical waveguides 200 are combined into two Y-polarization and X-polarization optical waveguides 200 by a Y-combining portion b and an X-combining portion c and thereafter, are coupled to the output optical system 112 by the two output waveguides 122.

Further, an end face of the single input waveguide 121 is formed at the first end 102a of the chip 102 in the length direction X (end face Xin). In contrast, end faces of the two output waveguides 122 are formed an end face 102c (end face Yout) of the chip 102 in the width direction Y that is orthogonal to the length direction X. Therefore, the two output waveguides 122, after being formed along the length direction X on the chip 102, are formed toward the width direction Y and are bent in the width direction Y that is substantially orthogonal to the length direction X.

Here, the chip 102 is configured using thin-film LN, thereby enabling the output waveguides 122 to be bent at right angles. The thin-film LN optical modulator confines light to the optical waveguides to a greater extent than does a bulk LN optical modulator. For example, a diameter of light in a bulk LN optical waveguide is in a range from about 5 to 10 μm while a diameter of light in the thin-film LN optical waveguides is about 1 μm, thus, enabling confinement of the light. In this manner, configuration of the chip 102 using thin-film LN enables the output waveguides 122 to be bent at right angles.

Here, in FIG. 1, the output optical system 112 is depicted to have a larger size than the size of the input optical system 111. For example, the number of optical components configuring the output optical system 112 is greater than the number of optical components configuring the input optical system 111, whereby the size of the output optical system 112 increases. For example, in an instance in which the output optical system 112 includes a prism that couples two output optical beams, a polarization beam coupler (PBC), etc., the output optical system 112 increases in size.

Here, assuming an instance in which the output optical system 112 is disposed occupying a space (length) in the length direction X of the chip 102, in the package 101, the length of the chip 102 in the length direction X is reduced by the length necessary for the output optical system 112. Regarding this point, in the first embodiment, the output optical system 112, which occupies space for installation, is not disposed on the length direction X of the chip 102 in the package 101 but rather is disposed shifted in the width direction Y of the chip 102. As a result, in the package 101, a space (length) necessary for the output optical system 112 is established and a predetermined length is ensured for the chip 102.

Further, even when the output optical system 112, which occupies space in the package 101, is disposed, without shortening the length of the chip 102, a predetermined length may be established for the chip 102. A predetermined length is ensured for the chip 102, whereby the length of the interaction part of the IQ modulating unit 120 may be ensured.

In other words, the drive voltage Vπ of the driver 113 for the chip 102 of the optical modulator is dependent on the RF signal and the magnitude of the interaction length for light in the IQ modulating unit 120. This length may be established without shortening the length of the chip 102, whereby the drive voltage Vπ may be reduced. As a result, as described below, it becomes possible to enhance characteristics of the optical modulator.

(1) Output voltage of the driver 113 is reduced, power consumption may be reduced
(2) Size of power source for DC bias for adjusting operating point of optical modulator may be reduced
(3) Degree of modulation increases, modulation loss of device may be reduced Further, the output optical system 112 is disposed shifted in the width direction Y of the chip 102, whereby the input optical system 111 alone is disposed at the first end 102a of the chip 102. As a result, the input optical system 111 and the output optical system 112 may both be disposed with some leeway.

FIGS. 3A, 3B, 4, 5, 6, 7A, and 7B are diagrams depicting specific examples of configuration of the optical modulator according to the first embodiment. Various configuration examples of optical coupling and arrangement of the input optical system 111, the output optical system 112, the chip 102 in the optical modulator 100 are described with reference to FIGS. 3A to 7B.

Figure 3B:
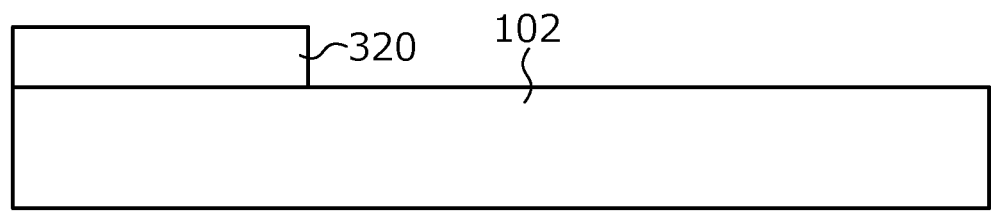
FIG. 3B is a diagram depicting a specific example of a configuration of the optical modulator according to the first embodiment.

FIG. 3A is a plan view of a portion of the optical modulator; FIG. 3B is a cross-sectional view of a portion of the optical modulator. As depicted in FIG. 3A, the input optical system 111 includes a pair of lenses 301, 302 disposed along the length direction X. The lens 301 collimates (makes parallel) diffused light from the end face of the input optical fiber 131. The lens 302 converges the collimated light in the length direction X and inputs the light to the end face Xin of the input waveguide 121 of the chip 102.

The output optical system 112 includes lenses 311, an optical path changing element (optical path converting prism) 312, a polarization rotating element (½λ waveplate) 313, a polarization coupling element (PBC) 314, and a lens 315.

The lenses 311 correspond to two optical signals X, Y output from the end faces Yout of the output waveguides 122 in the width direction Y; the two lenses 311 are provided along the length direction X and each collimates diffused light. The optical path converting prism 312 reflects, in the length direction X, the optical paths of the optical signals X, Y input thereto from the width direction Y and thereby converts the optical path.

The ½λ waveplate 313 rotates, by 90 degrees, a polarization direction of one of the two optical signals of the optical paths that are converted by the optical path converting prism 312 (for example, the optical signal Y). After the optical signal X passes through the optical path converting prism 312 and the optical signal Y passes through the ½λ waveplate 313, the optical signals X, Y are input to the PBC 314, and the optical signals X, Y are polarization coupled. The lens 315 converges and inputs to the end face of the output optical fiber 132, the optical signals that are polarization coupled by the PBC 314.

As depicted in FIG. 3B, a surface of a portion of the first end 102a of the chip 102 has a predetermined length (for example, 1 mm) from the first end 102a with respect to the length direction X and a fixture 320 is provided spanning an entire area in the width direction Y. The fixture 320 is provided in a shape that covers a part of surfaces of the optical waveguides (the input waveguide 121, the output waveguides 122) formed on the wafer. The fixture 320 contains a glass or LN-based material and is adhered on the substrate of the chip 102 by an adhesive or the like.

The fixture 320 functions as a protective member of the optical waveguide when the chip 102 is cut and separated from the wafer by dicing. Further, the fixture 320 is provided on the chip 102, whereby an occurrence of burrs, cracks, etc. at end face portions (the first end 102a, the side end face 102c) of the chip 102 during dicing is suppressed, enabling accurate formation of the end face Xin of the input waveguide 121 and the end faces Yout of the output waveguides 122.

The output waveguides 122 on the chip 102 are formed bent from the length direction X in a direction substantially orthogonal thereto in the width direction Y and when enlarged, a corner portion is curved having a radius R of a few hundred μm. As described above, the diameter of light in the thin-film LN optical waveguides is about 1 μm and the light may be strongly confined. Configuration of the chip 102 using thin-film LN enables the output waveguides 122 to be bent at right angles and enables bending in a range that is at most a length (1 mm) of the fixture 320.

The lens 301 of the input optical system 111 and the lens 315 of the output optical system 112 may be disposed in the fiber boots 133, respectively.

In the configuration described above, the input optical system 111 has a length of a few mm in the length direction X. In the length direction X, the output optical system 112 has a length greater than the length of the input optical system 111. Therefore, according to the configuration described above, the input optical system 111 alone is disposed along the length direction X of the chip 102 in the package 101, whereby it becomes possible to ensure a predetermined length for the chip 102. The output optical system 112 is disposed shifted in the width direction Y of the chip 102, thereby enabling overlap of a length x1 with the chip 102 in the length direction X, whereby the length of the chip 102 in the package 101 may be further increased by this length x1. In other words, the length of the chip 102 is increased as much as possible in the package 101.

Figure 4:
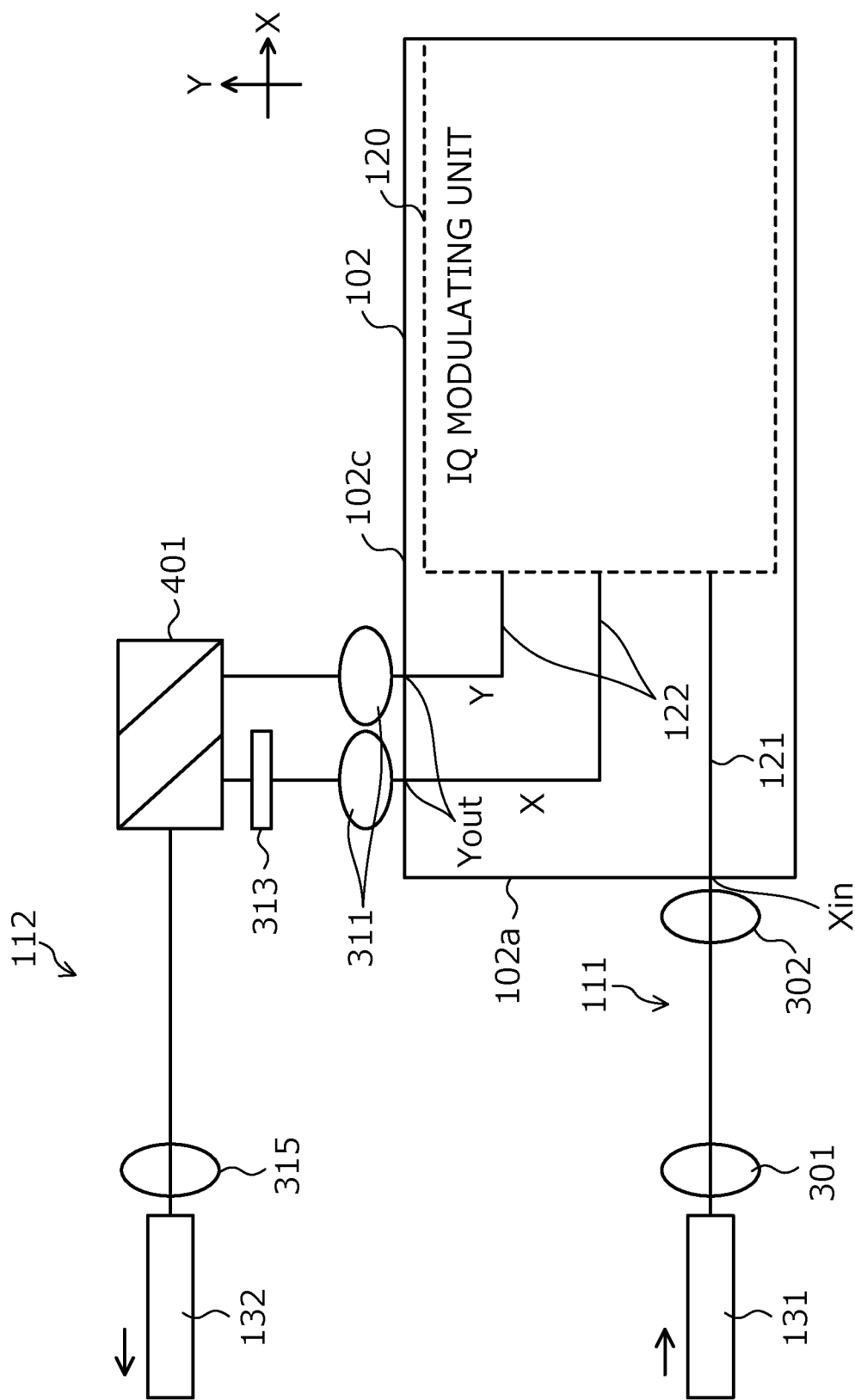
FIG. 4 is a diagram depicting a specific example of a configuration of the optical modulator according to the first embodiment.

Next, a configuration example of an optical modulator depicted in FIG. 4 is described. In FIG. 4, spreading and convergence of the optical paths of the input optical system 111 and the output optical system 112 depicted in FIG. 3A are not depicted in a sideview depicted in FIG. 3B. On the chip 102, the fixture 320 similar to that depicted in FIG. 3B is assumed to be provided. Hereinafter, components similar to those depicted in FIGS. 3A and 3B are given the same reference characters used in FIGS. 3A and 3B.

In the configuration example depicted in FIG. 4, the input optical system 111 is configured similarly to that in FIG. 3A. The output optical system 112 includes the lenses 311, the ½λ waveplate 313, an optical path converting and PBC prism 401, and the lens 315.

The lenses 311 correspond to two optical signals X, Y output from the end faces Yout of the output waveguides 122 in the width direction Y; two of the lenses 311 are provided along the length direction X and each collimates diffused light.

The ½λ waveplate 313 rotates, by 90 degrees, the polarization direction of one of the two optical signals of the optical paths that are converted by the optical path converting prism 312 (for example, the optical signal X). The optical path converting and PBC prism 401 has a function of an optical path converting prism and a function of a PBC. The optical path converting and PBC prism 401 reflects, in the length direction X, the optical path of the optical signals X, Y input thereto from the width direction Y and thereby converts the optical path. Further, the optical path converting and PBC prism 401 polarization couples the optical signal Y with the optical signal X that has passed through the ½λ waveplate 313. The lens 315 converges the optical signals polarization coupled by the optical path converting and PBC prism 401 and inputs the optical signal to the end face of the output optical fiber 132.

According to the described configuration, the output optical system 112 is disposed shifted in the width direction Y of the chip 102, whereby it becomes possible to establish a greater length of the chip 102 in the package 101. In other words, in the package 101, the length of the chip 102 may be as long as possible. Further, the optical path converting and PBC prism 401 is used, whereby the functions of the optical path converting prism 312 and the PBC 314 depicted in FIG. 3A may be combined into a single optical component and as compared to the configuration depicted in FIGS. 3A and 3B, the optical path length of the output optical system 112 may be shortened and the number of components may be reduced.

Next, a configuration example of an optical modulator depicted in FIG. 5 described. In FIG. 5, the input optical system 111 has a configuration similar to that depicted in FIG. 3A. The output optical system 112 includes a lens array 501, the optical path converting prism 312, the ½λ waveplate 313, the PBC 314, and the lens 315.

The lens array 501 is formed by two integrated lenses 501a, 501b arranged along the length direction X. The lenses 501a, 501b of the lens array 501 collimate diffused light of the optical signals X, Y in the width direction Y from the end faces Yout of the output waveguides 122.

The optical path converting prism 312 converts, to the length direction X, the optical paths of the optical signals X, Y output from the width direction Y. The ½λ waveplate 313 rotates, by 90 degrees, the polarization direction of one of the two optical signals of the optical paths that are converted by the optical path converting prism 312 (for example, the optical signal X). After the optical signal Y passes through the optical path converting prism 312 and the optical signal X passes through the ½λ waveplate 313, the optical signals Y, X are input to the PBC 314, and the optical signals X, Y are polarization coupled. The lens 315 converges and inputs to the end face of the output optical fiber 132, the optical signals that are polarization coupled by the PBC 314.

According to the described configuration, the output optical system 112 is disposed shifted in the width direction Y of the chip 102, whereby it becomes possible to establish a greater length of the chip 102 in the package 101. In other words, in the package 101, the length of the chip 102 may be as long as possible. Further, the two lenses 501a, 501b necessary for the two optical signals X, Y input to the output optical system 112 are combined in an array by the lens array 501, whereby the number of lens components may be reduced.

Further, use of the lens array 501 enables a distance between the two lenses 501a, 501b to be reduced and accordingly, on the chip 102, an interval between the output waveguides 122 of the two optical signals X, Y may be reduced. The interval between the output waveguides 122 of the two optical signals X, Y may be close to each other in at least one of the length direction X and the width direction Y, and a necessary length in the length direction X for bending the output waveguides 122 may be reduced correspondingly. For example, the interval between the output waveguides 122 of the two optical signals X, Y may be shorter as compared to the configuration depicted in FIGS. 3A and 3B, and the length of the optical waveguides 200 related to the interaction length on the chip 102 may be ensured to be longer by this amount.

Next, a configuration example of an optical modulator depicted in FIG. 6 is described. In FIG. 6, the output optical system 112 has a configuration similar to that depicted in FIG. 3A. Regarding the input optical system 111, in the configuration depicted in FIG. 3A described above, the input optical system 111 is configured by the pair of lenses 301, 302 along the length direction X, however, the configuration depicted in FIG. 6 differs only in that the input optical system 111 is configured by a single lens 601.

The lens 601 converges diffused light from the end face of the input optical fiber 131 and inputs the light to the end face Xin of the input waveguide 121 of the chip 102. For example, the diameter of the optical signal at an output end face of the input optical fiber 131 is about 10 μm and the diameter of the optical signal at the end face Xin of the input waveguide 121 is about 1 μm. The lens 601 has respectively different focal lengths set for the input side and the output side thereof, whereby the optical signal output from the input waveguide 121 may be input to the end face Xin of the input waveguide 121.

According to the configuration described above, the output optical system 112 is disposed shifted in the width direction Y of the chip 102, whereby it becomes possible to establish a greater length of the chip 102 in the package 101. In other words, in the package 101, the length of the chip 102 may be as long as possible. Further, the input optical system 111 is configured by the single lens 601, whereby the number of lens components may be reduced and the optical path length of the input optical system 111 in the length direction X may be shorter as compared to the configuration depicted in FIGS. 3A and 3B. The length of the chip 102 in the package 101 may be increased by this amount.

Next, a configuration example of an optical modulator depicted in FIGS. 7A and 7B is described. In FIGS. 7A and 7B, the output optical system 112 has a configuration similar to that depicted in FIG. 3A. Regarding the input optical system 111, in the configuration depicted in FIG. 3A described above, the input optical system 111 is configured by the pair of lenses 301, 302 along the length direction X, however, the configuration depicted in FIGS. 7A and 7B differs in that without using a lens, the input optical fiber 131 is directly joined to the end face Xin of the input waveguide 121 by a butt joint.

As shown in the plan view depicted in FIG. 7A, a glass block 701 is provided at an end of the input optical fiber 131 and the glass block 701 is directly joined to the end face Xin of the input waveguide 121, using an adhesive, etc. During this joining, as shown in a partial cut-away side view depicted in FIG. 7B, an axis of a core 131a inside cladding of the input optical fiber 131 is adjusted to coincide with an axis of the input waveguide 121 at the end face Xin. In this configuration example, a fiber having a small diameter (for example, 3 μm to 4 μm) and a small mode field may be preferably used as the input optical fiber 131.

In the various specific examples of the first embodiment above, the configurations of the input optical system 111 and the output optical system 112 described using FIGS. 3A to 7B may be suitably combined.

According to the configurations described above, the output optical system 112 is disposed shifted in the width direction Y of the chip 102, whereby it becomes possible to establish a greater length of the chip 102 in the package 101. In other words, in the package 101, the length of the chip 102 may be as long as possible. Further, configuration is such that the input optical fiber 131 is joined directly to the input waveguide 121 without using a lens in the input optical system 111, whereby the number of components such as lenses is reduced and the optical path length of the input optical system 111 in the length direction X may be shorter as compared to the configuration depicted in FIG. 6. The length of the chip 102 in the package 101 may be increased by this amount. Further, optical signals may be optically coupled directly without spatial coupling, whereby optical loss of the optical coupling at a coupler may be reduced.

In the first embodiment described above, configuration may be such that the input optical system 111 and a portion of the optical components configuring the output optical system 112 are housed in the fiber boots 133 and are not housed in the package 101. For example, in the specific configuration example depicted in FIGS. 3A and 3B, the ½λ waveplate 313, the PBC 314, and the lens 315 of the output optical system 112 positioned further outside than is the chip 102 in the length direction X may be housed in the fiber boots 133 external to the package 101. Further, in the configuration example depicted in FIGS. 3A and 3B, the lens 302 positioned further outside than is the chip 102 in the length direction X may be housed in the fiber boots 133. As a result, the length of the chip 102 in the package 101 may be further increased.

In a second embodiment, a configuration is described in which, contrary to the first embodiment, the optical system for output is disposed on the length direction of the chip, and the optical system for input is disposed in the width direction of the chip. In this instance, regarding the optical waveguides formed on the chip, the optical waveguides for output are disposed along the length direction of the chip and the optical waveguide for input is disposed bent in the width direction of the chip.

Figure 8:
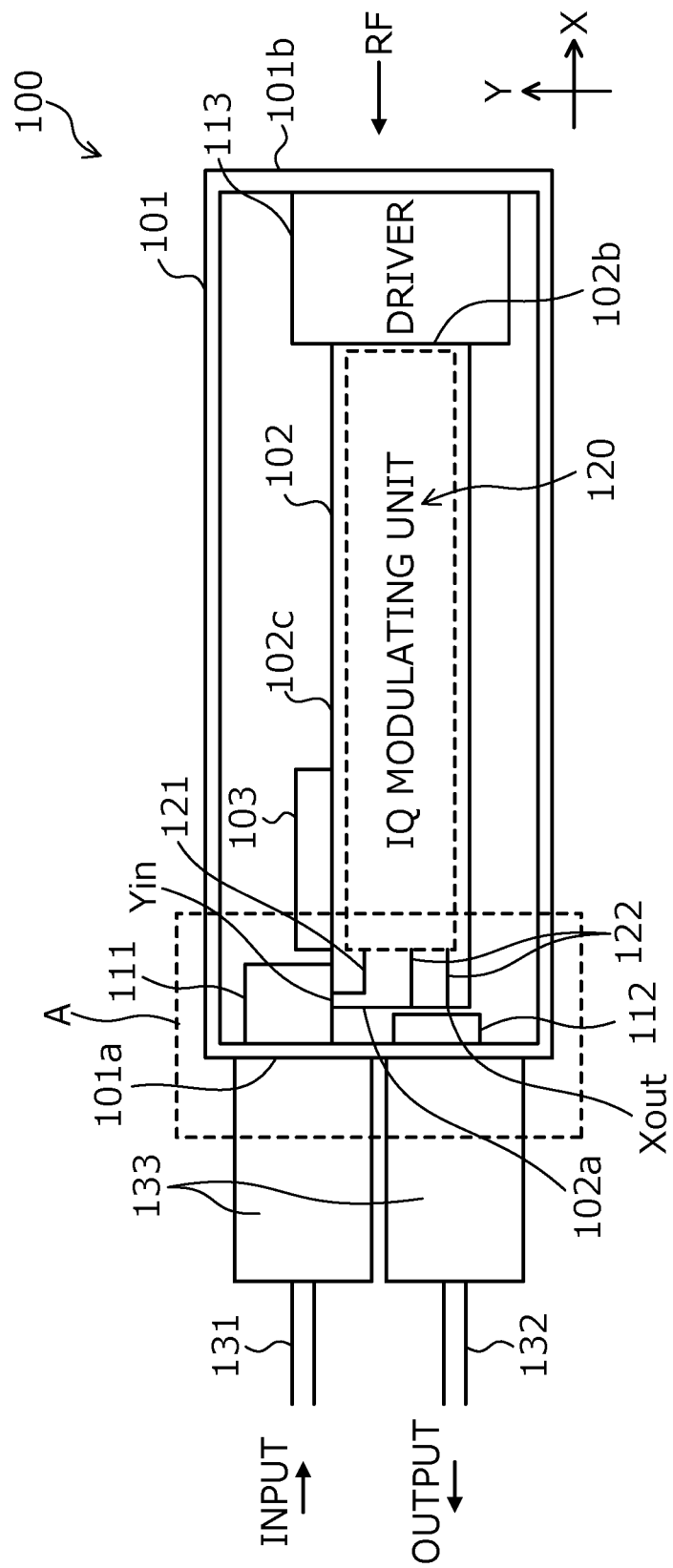
FIG. 8 is a plan view of an optical modulator according to a second embodiment.

FIG. 8 is a plan view of an optical modulator according to a second embodiment. In FIG. 8, components similar to those depicted in FIG. 1 are given the same reference characters used in FIG. 1. As depicted in FIG. 8, in the package 101, the output optical system 112 is disposed in the length direction X of the chip 102 and the input optical system 111 is disposed shifted in the width direction Y of the chip 102.

Further, on the chip 102, the end face of the one input waveguide 121 is formed at the side end face 102c (end face Yin) of the chip 102 in the width direction Y. The end faces of the two output waveguides 122 are formed at the first end 102a (end faces Xout) of the chip 102 in the length direction X. Therefore, the input waveguide 121 is formed on the chip 102, along the length direction X and thereafter, is formed bent at a right angle in the width direction Y.

FIGS. 9, 10, 11, and 12 are diagrams depicting specific examples of configuration of the optical modulator according to the second embodiment. Hereinafter, components similar to those in the configurations described in the first embodiment (FIGS. 3A and 3B, etc.) are given the same reference characters used in the first embodiment.

Figure 9:
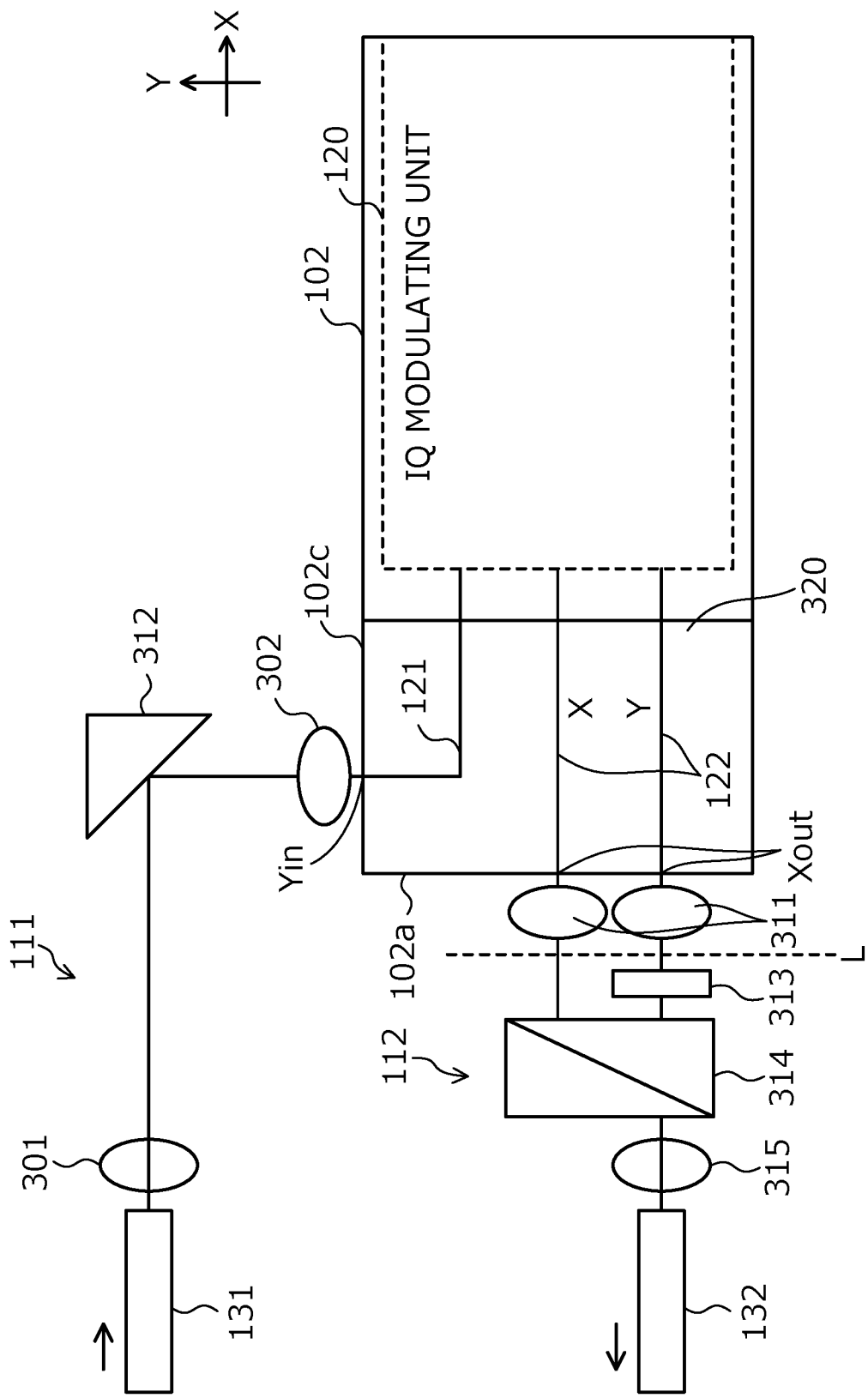
FIG. 9 is a diagram depicting a specific example of a configuration of the optical modulator according to the second embodiment.

In the configuration example depicted in FIG. 9, the input optical system 111 includes the pair of lenses 301, 302 and the optical path converting prism 312. The lens 301 collimates (makes parallel) diffused light from the end face of the input optical fiber 131. The optical path converting prism 312 reflects, in the width direction Y, the optical path of the optical signal input from the length direction X and thereby converts the optical path. The lens 302 converges the collimated light in the width direction Y and inputs the light to the end face of an input waveguide 121Yin of the chip 10.

The output optical system 112 includes the lenses 311, the ½λ waveplate 313, the PBC 314, and the lens 315.

The lenses 311 correspond to the two optical signals X, Y guided in the length direction X on the output waveguides 122; the two lenses 311 are provided along the width direction Y and each collimates diffused light.

The ½λ waveplate 313 rotates, by 90 degrees, the polarization direction of one of the two optical signals of the optical paths that are converted by the lenses 311 (for example, the optical signal Y). After the optical signal X passes through the lenses 311 and the optical signal Y passes through the ½λ waveplate 313, the optical signals X, Y are input to the PBC 314, and the optical signals X, Y are polarization coupled. The lens 315 converges and inputs to the end face of the output optical fiber 132, the optical signals that are polarization coupled by the PBC 314.

Further, at the surface of a portion of the first end 102a of the chip 102, the fixture 320 is provided. The fixture 320 is provided in a shape that covers a part of the surfaces of the optical waveguides (the input waveguide 121, the output waveguides 122) formed on the wafer.

The input waveguide 121 on the chip 102 is formed bent from the width direction Y to have an angle to, thereby, be substantially orthogonal to the length direction X. Configuration of the chip 102 using thin-film LN enables the output waveguides 122 to be bent at right angles and enables bending in a range that is at most a length (1 mm) of the fixture 320.

Here, a portion of the optical components configuring the output optical system 112 and the input optical system 111 may be disposed in the fiber boots 133, respectively. In the output optical system 112, for example, the ½λ waveplate 313, the PBC 314, and the lens 315 may be disposed in the fiber boot 133 positioned outside an end L of the package 101.

According to the configuration described above, at the first end 102a of the chip 102 in the package 101, the output optical system 112 alone may be disposed and disposal of the input optical system 111 at the first end 102a of the chip 102 is unnecessary. As a result, in the width direction Y of the first end 102a of the chip 102, limitations on the arrangement of the input optical system 111 and the output optical system 112 may be eliminated. In other words, the input optical system 111 is disposed shifted in the width direction Y of the chip 102, whereby at the first end 102a of the chip 102, the output optical system 112 alone may be disposed. As a result, the input optical system 111 and the output optical system 112 may both be disposed with some leeway.

Further, a portion of the optical components configuring the output optical system 112 disposed on the length direction X of the chip 102 may be disposed outside the package 101, whereby a predetermined length may be ensured for the chip 102 disposed in the package 101.

Figure 10:
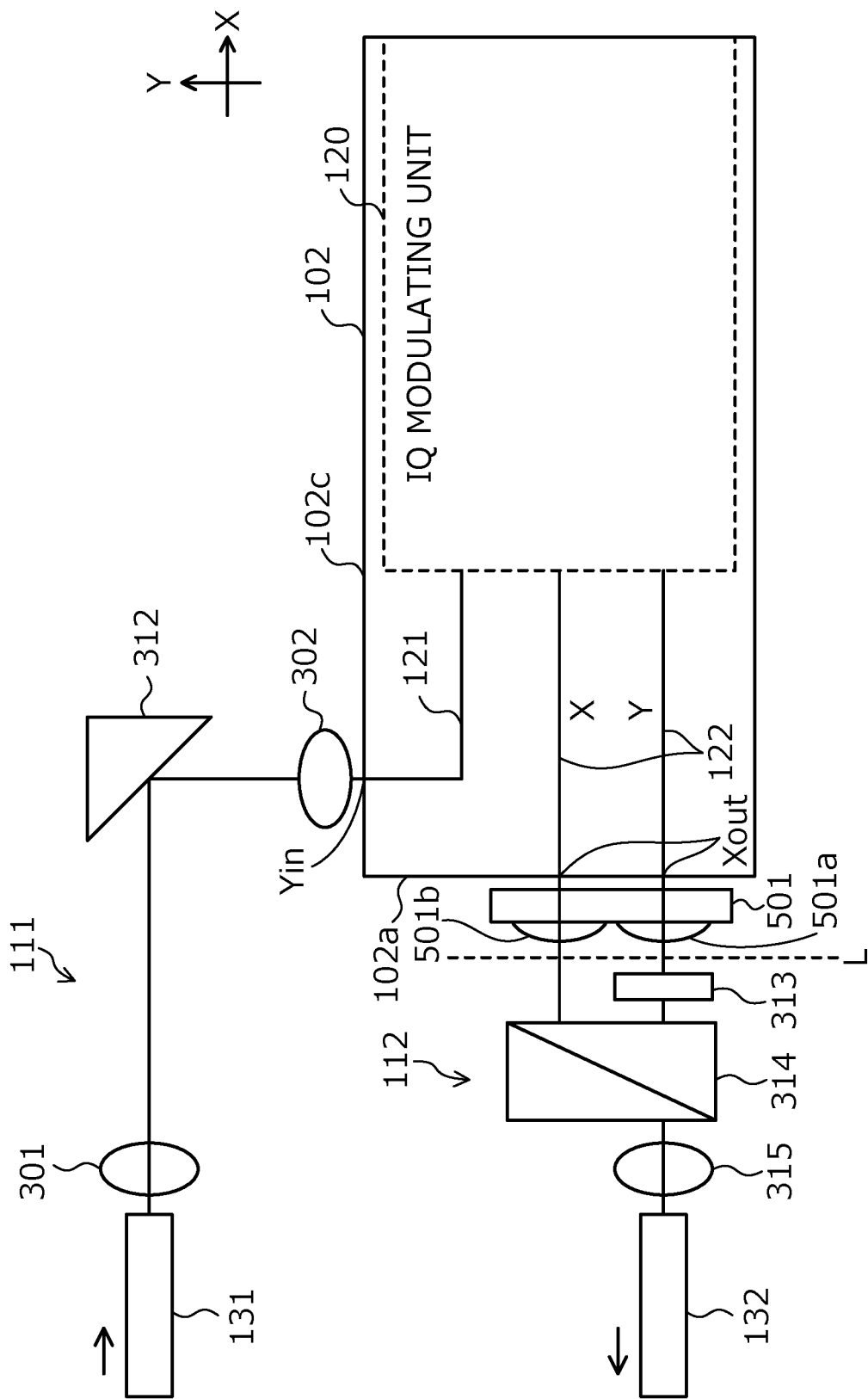
FIG. 10 is a diagram depicting a specific example of a configuration of the optical modulator according to the second embodiment.

In the configuration example depicted in FIG. 10, the input optical system 111 has a configuration similar to that depicted in FIG. 9. The output optical system 112 includes the lens array 501, the ½λ waveplate 313, the PBC 314, and the lens 315.

The lens array 501 is formed by the two integrated lenses 501a, 501b arranged along the width direction Y. The lenses 501a, 501b of the lens array 501 collimate diffused light of the optical signals X, Y output from the end faces Xout of the output waveguides 122 in the length direction X.

The ½λ waveplate 313 rotates, by 90 degrees, the polarization direction of one of the two optical signals of the optical paths that are converted by the optical path converting prism 312 (for example, the optical signal Y). After the optical signal X passes through the lens 501b and the optical signal Y passes through the ½λ waveplate 313, the optical signals are polarization coupled by the PBC 314. The lens 315 converges and inputs to the end face of the output optical fiber 132, the optical signals that are polarization coupled by the PBC 314.

According to the described configuration, the input optical system 111 is disposed shifted in the width direction Y of the chip 102, whereby the input optical system 111 and the output optical system 112 may both be disposed with some leeway.

Further, the two lenses 501a, 501b necessary for the two optical signals X, Y input to the output optical system 112 are combined in an array by the lens array 501, whereby the number of lens components may be reduced.

Further, use of the lens array 501 enables the distance between the two lenses 501a, 501b to be reduced and accordingly, on the chip 102, the interval between the output waveguides 122 of the two optical signals X, Y may be reduced. The width of the output optical system 112 in the width direction Y may be reduced correspondingly.

Further, a portion of the optical components configuring the output optical system 112 disposed on the length direction X of the chip 102, for example, the ½λ waveplate 313, the PBC 314, and the lens 315, may be disposed in the fiber boots 133 outside of the package 101. In this manner, a portion of the optical components of the output optical system 112 are disposed outside the end L of the package 101 (in the fiber boots 133), whereby a predetermined length may be ensured for the chip 102 disposed in the package 101.

In the configuration example depicted in FIG. 11, the output optical system 112 has a configuration similar to that depicted in FIG. 9. The input optical system 111 is configured using a lens and optical path converting prism 1101. The lens and optical path converting prism 1101 reflects, in the width direction Y, the optical path of the optical signal diffused along the length direction X from the end face of the input optical fiber 131 and thereafter, converges signal light in the width direction Y and inputs the signal light to the end face of the input waveguide 121Yin of the chip 102.

According to the configuration described above, the input optical system 111 is disposed shifted in the width direction Y of the chip 102, whereby the input optical system 111 and the output optical system 112 may both be disposed with some leeway.

Further, a portion of the optical components configuring the input optical system 111 are configured by the integrated lens and optical path converting prism 1101 and therefore, the number of components of the input optical system 111 may be reduced to a minimum.

Further, a portion of the optical components configuring the output optical system 112 disposed on the length direction X of the chip 102, for example, the ½λ waveplate 313, the PBC 314, and the lens 315 may be disposed in the fiber boot 133 outside of the package 101. In this manner, a portion of the optical components of the output optical system 112 are disposed outside the end L of the package 101 (in the fiber boot 133), whereby a predetermined length may be ensured for the chip 102 disposed in the package 101.

The configuration example depicted in FIG. 12 is a modified example of that depicted in FIG. 11. The input lens and optical path converting prism 1101 used as the input optical system 111 has a first side surface 1101a that is directly joined to a portion of the end face of the input waveguide 121Yin of the chip 102 by a butt joint and an adhesive, etc.

Further, at the end of the input optical fiber 131, the glass block 701 is provided and the glass block 701 is directly joined to a second side surface 1101b of the input lens and optical path converting prism 1101.

According to the configuration described above, the input optical system 111 is disposed shifted in the width direction Y of the chip 102, whereby the input optical system 111 and the output optical system 112 may both be disposed with some leeway.

Further, configuration is such that the input optical fiber 131 is joined directly to the input waveguide 121, via the input lens and optical path converting prism 1101 without using a lens in the input optical system 111, whereby the number of components such as lenses may be reduced. Further, optical signals may be optically coupled directly without spatial coupling, whereby optical loss of the optical coupling at a coupler may be reduced.

Further, a portion of the optical components configuring the output optical system 112 disposed on the length direction X of the chip 102, for example, the ½λ waveplate 313, the PBC 314, and the lens 315, may be disposed in the fiber boot 133 outside of the package 101. In this manner, a portion of the optical components of the output optical system 112 are disposed outside the end L of the package 101 (in the fiber boot 133), whereby a predetermined length may be ensured for the chip 102 disposed in the package 101.

In the various specific examples of the second embodiment above, the configurations of the input optical system 111 and the output optical system 112 described using FIGS. 9 to 12 may be suitably combined.

Figure 13A:
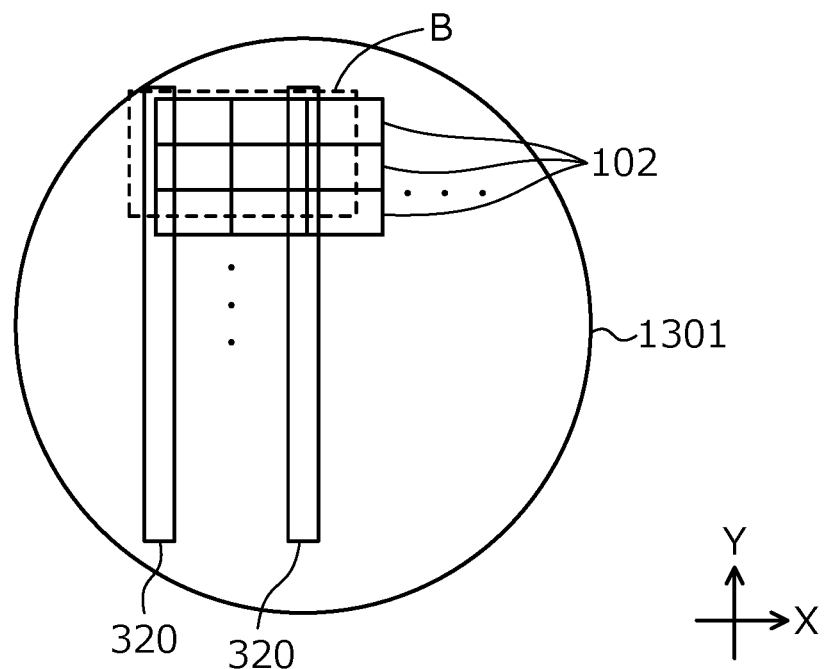
FIG. 13A is a plan view of a state of a chip of the optical modulator according to the embodiments during manufacture.

FIGS. 13A and 13B are plan views of states of the chip of the optical modulator according to the embodiments during manufacture. FIG. 13A depicts a chip arrangement state on the wafer and FIG. 13B is a partially enlarged view of a portion B in FIG. 13A.

As depicted in FIG. 13A, on a wafer 1301, the chip 102 is arranged in a matrix-like shape of multiple rows and columns. In the wafer 1301 state, in each of the chip 102 portions, the waveguides (the input waveguide 121, the output waveguides 122, the IQ modulating unit 120, etc.) are formed. On surfaces of the chips 102, the fixture 320 is provided in plural in the length direction X, each being formed to be relatively longer in the width direction Y.

As depicted in FIG. 13B, for example, a pair of the chips 102 disposed in the length direction X with the first ends 102a positioned symmetrically with the second ends 102b as a center therebetween. Here, the first ends 102a are disposed having a predetermined interval therebetween corresponding to twice the length of one of the chips 102 in the length direction X.

As a result, along the width direction Y, each of the fixtures 320 may be disposed between multiple chips 102 adjacent to one another in the width direction Y. Here, to comply with HB-CDM specifications, on the chip 102, the optical waveguides (the input waveguide 121, the output waveguides 122) are formed together at the first end 102a side. As a result, surface regions of the input waveguides 121 and the output waveguides 122 may be covered together by the fixtures 320. The fixtures 320 are joined to the surface portions of the input waveguides 121 and the output waveguides 122 of the chips 102 by an adhesive, etc.

Thereafter, along vertical and horizontal dicing lines D that correspond to borderlines between the chips 102, the wafer 1301 is cut, whereby the chips 102 may be cut from the wafer 1301. The fixtures 320 function as protective members of the optical waveguide when the chips 102 are cut and separated from the wafer by dicing. Further, the occurrence of burrs, cracks, etc. at portions of the end face (the first end 102a, the side end face 102c) of the chip 102 during dicing may be suppressed, and the end faces including the end face Xin of the input waveguide 121 and the end faces Yout of the output waveguides 122 may be provided with precision.

In this manner, the chips 102 are disposed on the wafer 1301, the optical waveguides are formed, and the fixtures 320 are provided on the chips 102, whereby each of the fixtures 320 may be provided simultaneously on multiple chips 102. In the present example, one of the fixtures 320 is disposed for multiple chips 102 in the width direction Y, whereby the number of the fixtures 320 may be reduced during manufacture.

As described above, the optical modulator 100 includes, in the package, the chip that modulates an optical signal and in which either the input waveguide or the output waveguides of the optical signal lead(s) to the first end facing the first side of the package while the other of the input waveguide and the output waveguides lead(s) to a side surface orthogonal to the first end, the optical modulator 100 further includes the input optical system and the output optical system optically coupled, respectively, to the input waveguide and the output waveguides of the chip. As a result, between the package and the chip, any one of the input optical system or the output optical system alone is disposed and the size of the chip, particularly, a length from the first end to the second end may be ensured. For example, the optical system having a relatively shorter optical path length or a fewer number of components is disposed between the package and the chip while the other optical system having a relatively longer optical path length or a greater number of components is disposed at a position shifted from between the package and the chip. As a result, the length of the chip may be ensured, the interaction length of the chip may be increased, and various characteristics as an optical modulator may be enhanced.

Further, the input waveguide or the output waveguides leading to a side surface of the chip may be bent midway in a substantially orthogonal direction. As a result, either the input waveguide or the output waveguides may be disposed at a first-end side of the chip and the other of the input waveguide and the output waveguides may be disposed at a side-surface side of the chip, the corresponding optical systems may be disposed at the first-end side and the side-surface side of the chip, respectively.

Further, in the chip, the fixture that covers a region where the input waveguide and the output waveguides are formed may be provided. The output waveguides and the input waveguide formed at the first-end side of the chip may be protected together by the fixture.

Further, configuration may be such that the input waveguide leads to the first end of the chip, the output waveguides lead to a side surface of the chip, the input optical system is provided between the first side of the package and the first end of the chip, the output optical system is provided at a position biased toward the side surface of the package. For example, in an instance in which the optical path length is relatively shorter or the number of components of the input optical system are fewer, the input optical system is disposed between the package and the chip. In this instance, the optical system having a relatively longer optical path length or a greater number of components is disposed on the side of the chip, shifted from between the package and the chip. As a result, the length of the chip may be ensured, the interaction length on the chip may be increased, and various characteristics as an optical modulator may be enhanced.

Further, the input waveguide has one waveguide while the output waveguides include two waveguides that correspond to different polarizations, and the output optical system may be configured to include the optical path changing element that changes the optical path to an orthogonal direction, the polarization rotating element, and the polarization coupling element. As a result, the output waveguides may output the modulated optical signals X, Y from the two waveguides. In this instance, the output optical system that outputs the optical signals from the side of the chip may change the optical path to a direction toward the first side of the package by the optical path changing element, rotate one of the polarization directions by the polarization rotating element, and couple and output the polarizations by the polarization coupling element.

Further, the optical path changing element and the polarization coupling element of the input optical system may be configured as a single component. As a result, the number of components of the input optical system are reduced, whereby the optical path length may be shortened and the length of the chip may be increased by this amount, and characteristics may be further enhanced.

Further, the output optical system may be configured to have the array of the two lenses that correspond to the two waveguides. As a result, the number of components of the output optical system may be reduced. Further, the interval between the two waveguides may be reduced and the length of the chip may be increased by this amount, whereby characteristics may be further enhanced.

Further, the input optical system may have a single lens having different focal lengths on the input side and the output side thereof. As a result, the number of components of the input optical system may be reduced. Further, it becomes possible for diffused light output from the optical fibers, etc. to be set as a principal bundle and input to the input waveguide of the chip.

Further, the input optical system may be configured to have the optical fiber joined directly to the input waveguide of the chip. As a result, the number of components of the input optical system may be reduced. Further, optical loss of the input light may be reduced.

Further, configuration may be such that the output waveguides lead to one end of the chip, the input waveguide leads to a side surface of the chip, and the output optical system is provided between the first side of the package and the one end of the chip while the input optical system is disposed at a position biased toward the side surface of the package. As a result, at the one end of the chip, either the input optical system or the output optical system alone is disposed and therefore, at this one end, limitations on the arrangement of the input optical system and the output optical system may be eliminated, whereby the input optical system 111 and the output optical system 112 may both be disposed in the package with some leeway.

Further, the input waveguide has one waveguide while the output waveguides include two waveguides that correspond to different polarizations, and the input optical system may be configured to include the optical path changing element that changes the optical path to an orthogonal direction while the output optical system may be configured to include the polarization rotating element and the polarization coupling element. As a result, optical signals may be input to the input waveguide of the chip via the input optical system disposed at the side of the chip. Further, from the output waveguides, the modulated optical signals X, Y may be output from the two waveguides.

Further, the output optical system may be configured by the array of the two lenses that correspond to the two waveguides. As a result, the number of components of the output optical system may be reduced.

Further, the lenses of input optical system and the optical path changing element may be implemented by a single component. As a result, the number of components of the input optical system may be reduced.

Further, the input optical system may be configured to have the optical fiber joined directly to the optical path changing element and the optical path changing element may be joined directly to the input waveguide of the chip. As a result, the number of components of the input optical system may be reduced. Further, optical loss of the input light may be reduced.

Further, the chip may contain lithium niobate. As a result, it becomes possible to obtain predetermined characteristics during optical modulation. Further, the chip may be a thin-film LN structure containing lithium niobate. As a result, the overall size of the chip decreases and characteristics may be enhanced. Further, confinement of the light guided by the input waveguide and the output waveguides is strengthened and the size of the waveguide may be reduced. Further, for example, of the input waveguide and the output waveguide, while the waveguide(s) led to a side surface of the chip has to be formed bent, this bent portion may be formed having a small radius of curvature and therefore, the bent portion does not occupy space in the length direction and the chip may be formed longer correspondingly, thereby enabling enhancement of characteristics.

Further, a portion of the optical components of at least one of the input optical system and the output optical system may be disposed in the optical fiber boots of the optical fibers provided on the first side of the package. As a result, for example, even in an instance in which the output optical system in which the optical path length is longer or the number of components is greater is disposed between the first side of the package and the first end of the chip, the length of the chip in the package may be ensured.

Further, a manufacturing method of the chip using the optical modulator may include processes of arranging the chip in plural in a matrix-like shape on a wafer, forming the input waveguides and the output waveguides at the first ends of the chips, joining the fixtures to the surfaces of the chips so that fixtures connect the input waveguides and the output waveguides formed at the first ends, and separating the wafer according to regions of the chips by dicing. When the chips are manufactured on the wafer, the input waveguides and the output waveguides are formed at the first ends of the chips so to be together. Further, one of the fixtures is disposed and joined so as to connect portions of multiple chips where the input waveguides and the output waveguides are formed at the first ends, whereby the chips may be manufactured simply.

According such an optical modulator, for example, even in a configuration in which optical signals are input and output from the first side of the package like an HB-CDM, components in the package such as the chip, the driver, the input and the output optical systems, etc. may be suitably disposed and various characteristics of the optical modulator may be enhanced.

According to one aspect, an optical modulator that may enhance characteristics without package limitations may be provided All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical modulator in which an optical signal is input and output from one side of a package, the optical modulator comprising:
   in the package, a chip that optically modulates an optical signal and in which an input waveguide and an output waveguide of the optical signal are led to mutually different destinations;

an input optical system coupled to the input waveguide of the chip; and an output optical system coupled to the output waveguide of the chip, wherein the input waveguide is led from one end of the chip facing the one side of the package, and the output waveguide is led to an other end of the chip facing a side orthogonal to the one end of the chip in a plan view, the input optical system is provided between the one side of the package and the one end of the chip such that the optical signal input from the one side of the package is input to the input waveguide through the input optical system, and the output optical system is disposed along the other end of the chip such that the optical signal output from the chip is output from the one side of the package through the output optical system.

2. The optical modulator according to claim 1, wherein the input waveguide or the output waveguide led to the other end of the chip is bent midway in a direction orthogonal to the other end.

3. The optical modulator according to claim 1, further comprising a fixture provided in the chip, covering a region of the chip where the input waveguide and the output waveguide are formed.

4. The optical modulator according to claim 1, wherein the input waveguide has a single waveguide, and the output waveguide includes two waveguides corresponding to different polarizations, and the output optical system includes an optical path changing element that changes an optical path to an orthogonal direction, a polarization rotating element, and a polarization coupling element.

5. The optical modulator according to claim 4, wherein the optical path changing element and the polarization coupling element of the input optical system are formed by a single component.

6. The optical modulator according to claim 4, wherein the output optical system has an array of two lenses corresponding to the two waveguides.

7. The optical modulator according to claim 4, wherein the input optical system has only one lens.

8. The optical modulator according to claim 4, wherein the input optical system is configured having an optical fiber joined directly to the input waveguide of the chip.

9. The optical modulator according to claim 1, wherein the chip contains lithium niobate.

10. The optical modulator according to claim 9, wherein the chip is a thin-film LN structure containing the lithium niobate.

11. The optical modulator according to claim 1, wherein a portion of a plurality of optical components of at least one of the input optical system and the output optical system is disposed in an optical fiber boot of an optical fiber provided at the one side of the package.

12. A manufacturing method of the optical modulator according to claim 1, the manufacturing method comprising:

arranging a plurality of chips in a matrix-shape on a wafer;

forming the input waveguide and the output waveguide at respective ends of the plurality of chips;

joining a fixture to surfaces of the plurality of chips, the fixture connecting the input waveguide and the output waveguide formed at the respective ends; and dicing and separating the wafer according to regions of the plurality of chips.

13. An optical modulator in which an optical signal is input and output from one side of a package, the optical modulator comprising:

in the package, a chip that optically modulates an optical signal and in which an input waveguide and an output waveguide of the optical signal are led to mutually different destinations;

an input optical system coupled to the input waveguide of the chip; and an output optical system coupled to the output waveguide of the chip, wherein the output waveguide is led from one end of the chip facing the one side of the package, and the input waveguide is led to an other end of the chip facing a side orthogonal to the one end of the chip in a plan view, the output optical system is provided between the one side of the package and the one end of the chip such that the optical signal output from the chip is output from the one side of the package through the output optical system, and the input optical system is disposed along the other end of the chip such that the optical signal input from the one side of the package is input to the input waveguide through the input optical system.

14. The optical modulator according to claim 13, wherein the input waveguide has a single waveguide, and the output waveguide includes two waveguides corresponding to different polarization, the input optical system includes an optical path changing element that changes an optical path to an orthogonal direction, and the output optical system includes a polarization rotating element and a polarization coupling element.

15. The optical modulator according to claim 14, wherein the output optical system has an array of two lenses corresponding to the two waveguides.

16. The optical modulator according to claim 14, wherein the optical path changing element and a lens of the input optical system are formed by a single component.

17. The optical modulator according to claim 14, wherein the input optical system is configured having an optical fiber joined directly to the optical path changing element and the optical path changing element joined directly to the input waveguide of the chip.

* * * * *